United States Patent
Tuhro (10) Patent No.: US 11,077,837 B2
(45) Date of Patent: Aug. 3, 2021

(54) CRUISE CONTROL CANCEL, WITH BRAKE PRECHARGE

(71) Applicant: Continental Automotive Systems, Inc., Auburn Hills, MI (US)

(72) Inventor: Matthew Conrad Tuhro, Sault Ste. Marie, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 157 days.

(21) Appl. No.: 16/291,591

(22) Filed: Mar. 4, 2019

(65) Prior Publication Data

US 2020/0189544 A1 Jun. 18, 2020

Related U.S. Application Data

(60) Provisional application No. 62/778,672, filed on Dec. 12, 2018.

(51) Int. Cl.
*B60T 13/66* (2006.01)
*B60T 1/06* (2006.01)
*B60K 31/00* (2006.01)

(52) U.S. Cl.
CPC ............ *B60T 13/662* (2013.01); *B60K 31/00* (2013.01); *B60T 1/065* (2013.01); *B60T 2201/12* (2013.01)

(58) Field of Classification Search
CPC .......... B60T 1/065; B60T 7/12; B60T 13/662; B60T 2201/12; B60K 31/00
USPC ........ 188/72.4, 73.1, 1.11 E; 303/138, 116.2
See application file for complete search history.

(56) References Cited

U.S. PATENT DOCUMENTS

| | | | | |
|---|---|---|---|---|
| 4,972,919 A | * | 11/1990 | Ogawa | B60K 31/047 123/361 |
| 5,924,508 A | * | 7/1999 | Clauss | B60T 8/00 180/179 |
| 6,237,729 B1 | * | 5/2001 | Blattert | B60T 13/741 188/1.11 E |

(Continued)

FOREIGN PATENT DOCUMENTS

DE 102009058154 A1 6/2011

OTHER PUBLICATIONS

International Search Report and Written Opinion dated Apr. 22, 2020 from corresponding International Patent Application No. PCT/US2019/065746.

*Primary Examiner* — Robert A. Siconolfi
*Assistant Examiner* — San M Aung (57) ABSTRACT

A hydraulic brake system for a vehicle which has expanded functionality, where a pre-charge occurs in the brake system upon deactivation of the cruise control, reducing the time needed to generate pressure in each brake unit, reducing stopping distance. The pre-charge function involves generating pressure in each caliper of the brake system upon deactivation of the cruise control function of the vehicle, such that the hydraulic brake system is pre-charged prior to the driver of the vehicle applying force to the brake pedal, which reduces stopping distance. One aspect of the pre-charge function includes generating enough pressure such that the brake pads contact each corresponding rotor. Another aspect of the pre-charge function includes generating enough pressure such that the brake pads apply force to each corresponding rotor, providing a minimum amount of deceleration prior to the driver of the vehicle applying force to the brake pedal.

19 Claims, 4 Drawing Sheets

(56) References Cited

U.S. PATENT DOCUMENTS

| | | | |
|---|---|---|---|
| 2002/0121398 A1* | 9/2002 | Kikuchi | G08G 1/166 |
| | | | 180/169 |
| 2003/0184151 A1* | 10/2003 | Mueller | B60T 7/12 |
| | | | 303/138 |
| 2006/0125315 A1* | 6/2006 | Hool | B60T 8/4872 |
| | | | 303/116.2 |
| 2012/0203438 A1 | 8/2012 | Breuer et al. | |
| 2012/0212353 A1 | 8/2012 | Fung et al. | |
| 2014/0100755 A1 | 4/2014 | Schwindt | |
| 2015/0001013 A1* | 1/2015 | Mennie | F16D 65/092 |
| | | | 188/73.1 |
| 2015/0283985 A1* | 10/2015 | Korthals | B60T 7/22 |
| | | | 701/70 |
| 2017/0350462 A1* | 12/2017 | Yao | B60T 13/741 |

* cited by examiner

CRUISE CONTROL CANCEL, WITH BRAKE PRECHARGE

CROSS-REFERENCE TO RELATED APPLICATIONS

This application claims the benefit of Provisional Application 62/778,682, filed Dec. 12, 2018. The disclosure of the above application is incorporated herein by reference.

FIELD OF THE INVENTION

The invention relates generally to a braking system having a pre-charge function, where the pre-charge function is activated upon deactivation of a vehicle's cruise control function.

BACKGROUND OF THE INVENTION

Hydraulic braking systems for vehicles typically include multiple braking units, each of which includes some type of actuator in electrical communication with a hydraulic electronic control unit (HECU). The actuator works with a caliper having a piston, and at least two brake pads to apply braking force to a brake rotor, or brake drum. The actuator is used to build pressure in one or more of the braking units, more specifically the caliper, and during operation of a vehicle having a hydraulic braking system, the pressure build-up is controlled by the HECU. This build-up of pressure typically occurs when the driver applies force to the brake pedal. When force is no longer applied to the brake pedal, fluid pressure in the calipers is relieved, and allowing the pistons to retract, releasing the brakes.

When the braking system is not in use, there is typically a gap between the rotor and each of the pads. Most hydraulic brake systems require a build-up of pressure in the braking units, such that each brake pad is positioned to be in contact with the corresponding rotor (eliminating the gaps) before any vehicle deceleration is achieved. This build-up of pressure, or "pre-charge," typically occurs after application of force to the brake pedal by the driver. This pre-charge increases the amount of time needed to generate braking force to decelerate the vehicle, causing a delay in the generation of braking force, and therefore increases the stopping distance of the vehicle.

There are instances where deceleration of the vehicle may occur without the driver applying force to the brake pedal. One of the instances where this type of deceleration may occur is after the deactivation of the cruise control function. The driver of the vehicle may then apply force to the brake pedal to decelerate the vehicle, however, there is still no braking force generated by the braking units until after the pre-charge has occurred, which causes an increase in stopping distance of the vehicle.

Accordingly, there exists a need for a hydraulic braking system which has expanded functionality, such that the pre-charge occurs after the deactivation of the cruise control, and prior to the driver applying force to the brake pedal, which results in braking force being achieved upon the application of force to the brake pedal by the driver, decreasing stopping distance.

SUMMARY OF THE INVENTION

The present invention is a hydraulic brake system for a vehicle which has expanded functionality, where a pre-charge occurs in the brake system upon deactivation of the cruise control, reducing the time needed to generate pressure in each brake unit, and therefore reducing stopping distance. In one embodiment, the hydraulic brake system includes several brake units, and each brake unit includes a caliper, and one or more brake pads which selectively apply force to a brake rotor. Each caliper is in fluid communication with some type of actuator capable of generating hydraulic pressure. The hydraulic brake system includes a pre-charge function, where the pre-charge function involves generating pressure in each caliper upon deactivation of the cruise control function of the vehicle, such that the hydraulic brake system is pre-charged prior to the driver of the vehicle applying force to the brake pedal, which reduces stopping distance.

In one embodiment, the pre-charge function includes generating enough pressure in each caliper such that the brake pads contact each corresponding rotor. In another embodiment, the pre-charge function includes generating enough pressure in each caliper such that the brake pads apply force to each rotor, providing a minimum amount of deceleration prior to the driver of the vehicle applying force to the brake pedal.

In an embodiment, the present invention is a braking system for a vehicle, which includes a hydraulic electronic control unit, at least one brake unit operable for being controlled by the hydraulic electronic control unit, at least one rotor, and a plurality of brake pads being part of the brake unit. A first of the plurality of brake pads is located on a first side of the rotor, and a second of the plurality of brake pads located on a second side of the rotor. The brake unit is operable for configuring the plurality of brake pads to selectively apply force to the rotor.

The vehicle includes a cruise control function operable for configuring the vehicle to maintain a constant speed. The braking system also includes a pre-charge function which includes generating pressure in the brake unit such that the first of the plurality of brake pads is in contact with the first side of the rotor, and the second of the plurality of brake pads is in contact with the second side of the rotor.

In an embodiment, the pre-charge function is activated when the cruise control function is deactivated.

A first air gap is located between the first side of the rotor and the first of the plurality of brake pads, and a second air gap located between the second side of the rotor and the second of the plurality of brake pads. Upon deactivation of the cruise control function and activation of the pre-charge function, as the pressure is generated in the brake-unit, the first of the plurality of brake pads is moved towards the first side of the rotor such that the first air gap is eliminated, and the second of the plurality of brake pads is moved towards the second side of the rotor such that the second air gap is eliminated.

The braking system also includes a brake pedal in communication with the hydraulic electronic control unit. The brake pedal may be in electrical communication or in hydraulic communication with the hydraulic electronic control unit. The hydraulic electronic control unit is operable for controlling the pressure generated by the brake unit based on the amount of force applied to the brake pedal. In an embodiment, the pre-charge function is activated prior to the driver of the vehicle applying force to the brake pedal.

In one embodiment, the pre-charge function is activated when the vehicle is travelling on an exit ramp of a highway. In another embodiment, the pre-charge function is activated when the vehicle is travelling on the highway, and the driver of the vehicle anticipates having to decelerate the vehicle which may be due to an accident seen by the driver, or increased traffic volume.

In one embodiment, the braking system includes a plurality of brake units, wherein the pre-charge function includes generating pressure in each of the plurality of brake units when the cruise control function is deactivated.

In one embodiment, the pre-charge function includes generating enough pressure in the brake unit such that the first of the plurality of brake pads applies force the first side of the rotor, and the second of the plurality of brake pads applies force to the second side of the rotor, decreasing the rotational speed of the rotor.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
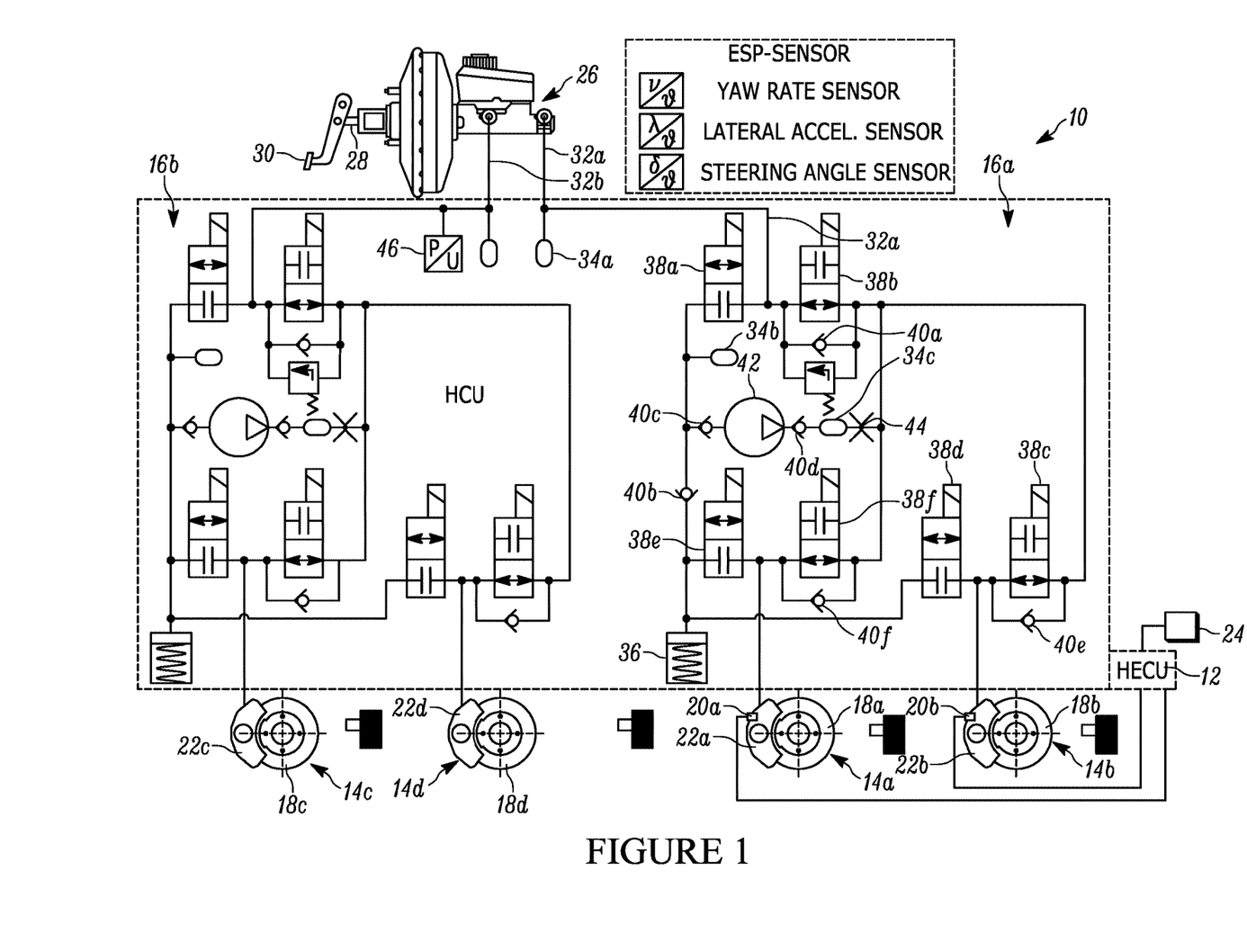
FIG. 1 is a diagram of a braking system for a vehicle, having a pre-charge function, according to embodiments of the present invention.

A diagram showing a hydraulic braking system having a pre-charge function according to the present invention is shown in FIG. 1, generally at 10. Referring to the Figures generally, the braking system 10 includes a hydraulic electronic control unit (HECU) 12, and the HECU 12 is in electrical communication with at least one brake unit, which in this embodiment is two rear brake units, shown generally at 14a,14b, which are part of a rear brake system, shown generally at 16A. The brake system 10 also includes two front brake units 14c,14d, which are part of a front brake system, shown generally at 16B. Each brake unit 14a,14b, 14c,14d is able to prevent the rotation of a corresponding rotatable element, which in this embodiment are rotors 18a,18b,18c,18d connected a corresponding wheel (not shown).

Figure 2A:
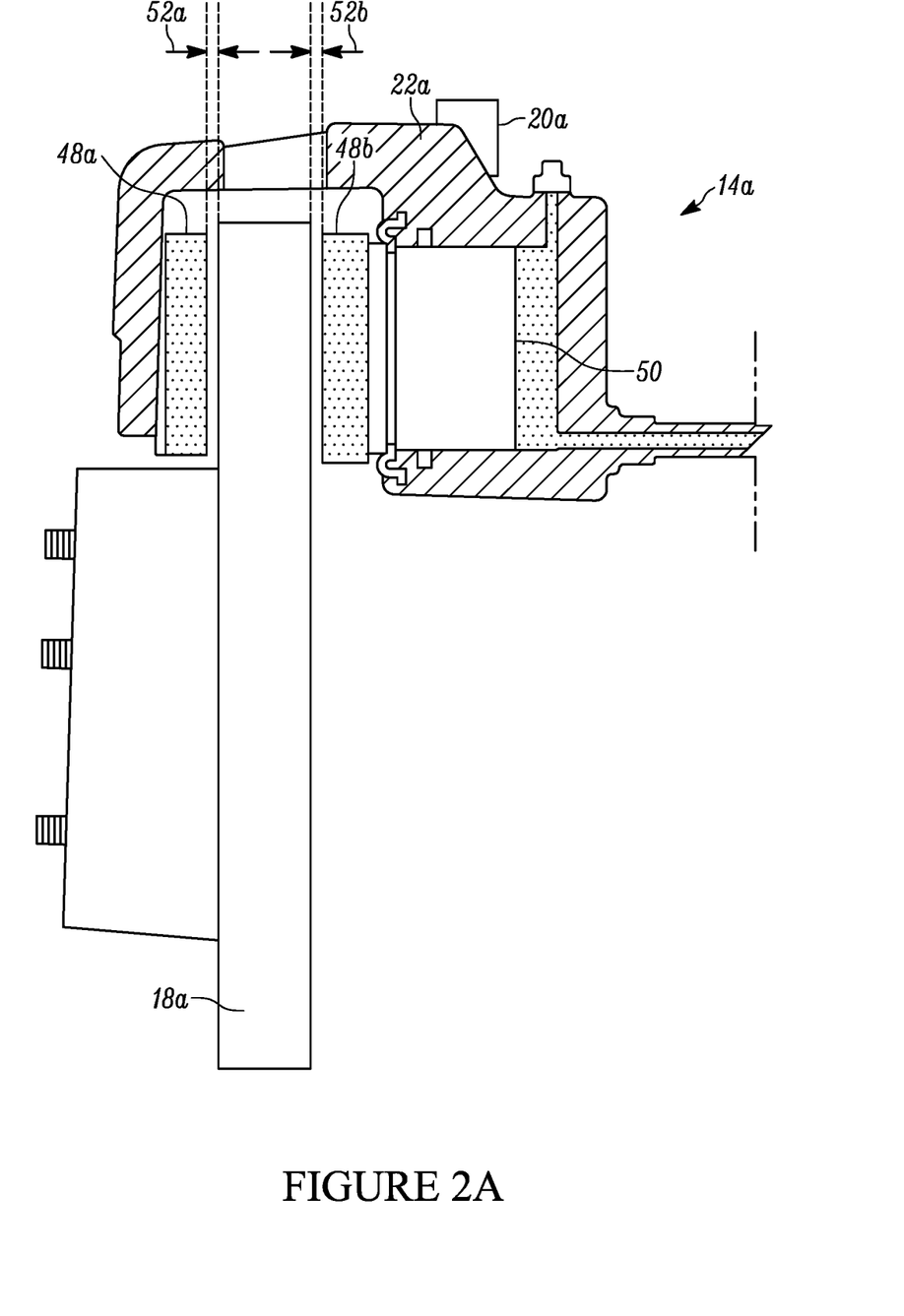
FIG. 2A is a diagram of a brake unit used as part of a braking system having a pre-charge function, where the pre-charge function is deactivated, according to embodiments of the present invention.
Figure 2B:
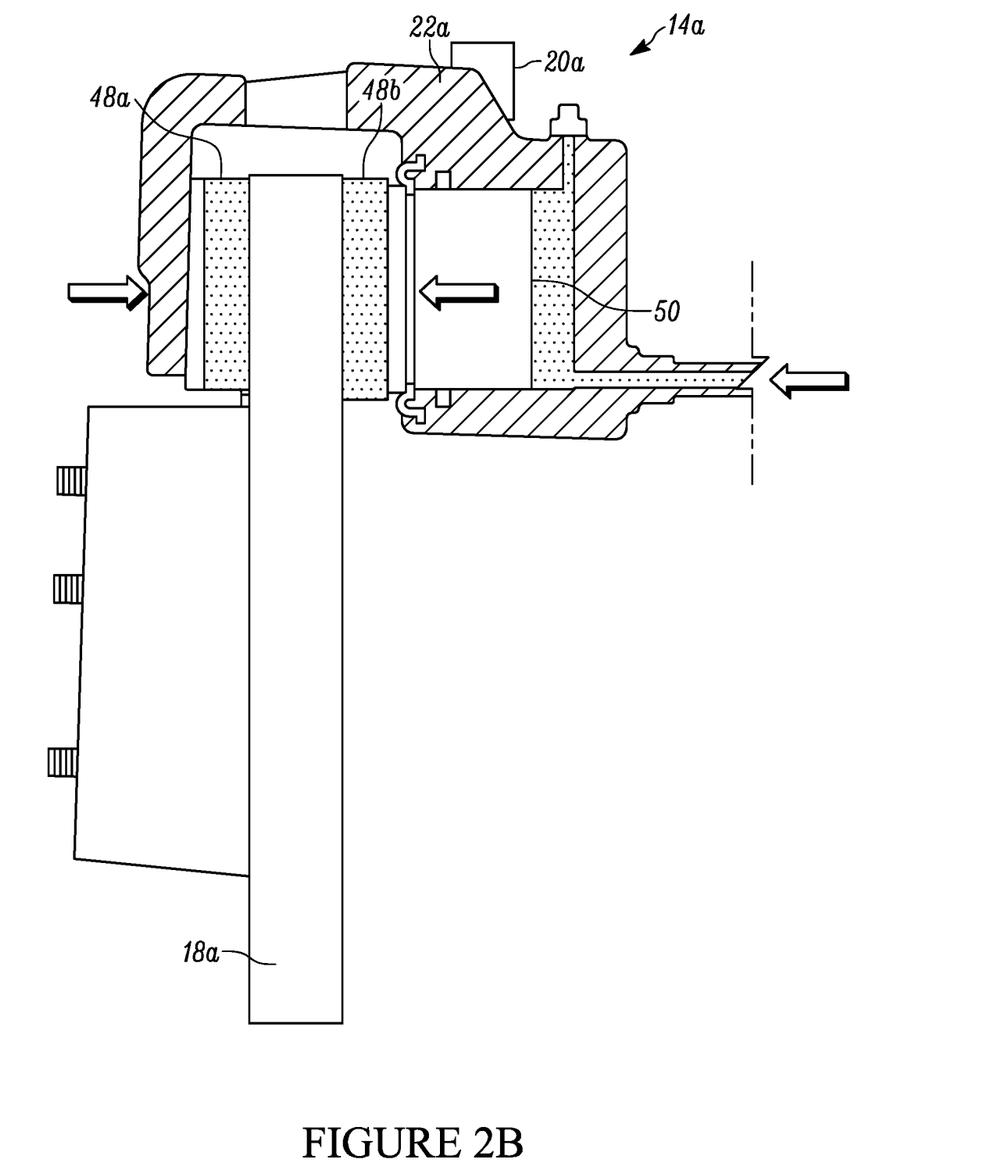
FIG. 2B is a diagram of a braking unit used as part of a braking system having a pre-charge function, where the pre-charge function is activated, according to embodiments of the present invention.

The hydraulic braking system 10 also includes an electronic parking brake function. Each rear brake unit 14a,14b includes an electronic parking brake actuator 20a,20b, and each electronic parking brake actuator 20a,20b is used with a piston located in a corresponding caliper 22a,22b to generate braking force. By way of example, the first brake unit 14a, shown in FIGS. 2A-2B, includes the caliper 22a, and a piston 50 located in the caliper 22a. The caliper 22a has two brake pads 48a,48b located on opposite sides of the rotor 18a, and the electronic parking brake actuator 20a is able to configure the piston 50 to apply force which is transferred from the brake pads 48a,48b to the rotor 18a. The movement of the piston 50 is achieved by the parking brake actuator 20a, or by fluid pressure applied to the piston 50. The first brake unit 14a is shown in FIGS. 2A,2B, however, the other brake units 14b,14c,14d have similar components.

Referring again to FIG. 1, the EPB system 10 also includes a switch 24, which is also in electrical communication with the HECU 12. The switch 24 is used to actuate the brake units 14a,14b. The HECU 12 includes software such that the HECU 12 is programmed to command the actuators 20a,20b to generate a requested clamping force on the rotors 18a,18b based on the actuation of the switch 24 by the driver of the vehicle. In one embodiment, the actuators 20a,20b are motor-gear-units, each of which includes a DC motor connected to a gear box for torque amplification, but it is within the scope of the invention that other types of actuators may be used, such as, but not limited to, a stand-alone DC motor (no gear box), a brushless DC motor, a stepper motor, or the like. The switch 24 may be used to perform the parking brake function, such as when the vehicle is in a parked location, and it is desired to prevent the vehicle from moving, such as when the vehicle is parked on a hill.

The brake system 10 also includes a tandem master cylinder (TMC), shown generally at 26. The TMC 26 is divided into various cavities, and has two pistons, one of which is connected to a connecting rod 28, and the connecting rod 28 is connected to and actuated by a brake pedal 30. There is a first primary feed conduit 32a connected to and in fluid communication with the rear brake system 16A and the TMC 26, and a second primary feed conduit 32b connected to and in fluid communication with the front brake system 16B and the TMC 26.

More specifically, the first primary feed conduit 32a is connected to and in fluid communication with a first accumulator 34a. There are also several other accumulators 34b,34c, and a low-pressure accumulator 36. The first primary feed conduit 32a splits, and is in fluid communication with a first solenoid valve 38a and a second solenoid valve 38b. There are also several other solenoid valves 38c,38d, 38e,38f which are part of the rear brake system 16A. The second valve 38b includes a check valve 40a to provide for pressure relief. There are also several other check valves 40b,40c,40d,40e,40f, which are part of the rear brake system 16A and function to provide pressure relief when necessary. The rear brake system 16A also includes a pump 42 for generating or relieving fluid pressure in the rear brake system 16A, and a restriction point 44 for controlling pressure, and several other conduits (not labeled) which provide fluid communication between the various components of the rear brake system 16A, as shown in FIG. 1.

The accumulators 34a,34b,34c,36, the solenoid valves 38a,38b,38c,38d,38e,38f, as well as the check valves 40a, 40b,40c,40d,40e,40f, and the pump 42 all control the flow of fluid and the fluid pressure in the conduits and the pressure in each caliper 22a,22b,22c,22d. Both the rear brake system 16A and the front brake system 16B have some type of actuator, which in this embodiment is the TMC 26, which generates fluid pressure in the rear brake system 16*a* based on the amount of force that is applied to the brake pedal 30 to generate braking force to decelerate the vehicle. Referring again to FIG. 1, the TMC 16 is activated when the driver applies force to the brake pedal 30, this may be controlled by the HECU 12, or in alternate embodiments, some other type of control unit.

In operation, the driver of the vehicle applies force to the brake pedal 30, which generates pressure in the TMC 26, and therefore generates pressure in the brake systems 16A, 16B. There is a pressure sensor 46 which detects this pressure increase, and information regarding the increase in pressure is transferred from the pressure sensor 46 to the HECU 12. More specifically, in the rear brake system 16*a*, based on the amount of force applied to the brake pedal 30, the TMC 26 is able to increase the pressure in the first caliper 22*a*, moving the piston 50 such that the pads 48*a*,48*b* apply force to the first rotor 18*a*, limiting or preventing rotation of the first rotor 18*a*. The other brake units 14*b*,14*c*,14*d* operate in a similar manner.

Referring now to FIGS. 2A-2B, the first brake unit 14*a* is shown to demonstrate the pre-charge function of the present invention, but is should be noted that the pre-charge function operates in the same manner with respect to the other brake units 14*b*,14*c*,14*d*. The pressure increase that is part of the pre-charge function is achieved by changing the configuration of the valves 38*a*,38*b* and activating the pump 42 such that pressure in the caliper 22*a* increases. This increase in pressure in the rear brake system 16A causes the piston 50 in the caliper 22*a* to move towards the pad 48*b*, applying force to the pad 48*b*, clamping the rotor 18*a* between both pads 48*a*,48*b*, generating a braking force to stop the vehicle.

However, when there is no force applied to the brake pedal 30, and the rotor 18*a* is released and allowed to rotate freely, there are air gaps 52*a*,52*b* on each side of the rotor 18*a*, shown in FIG. 2A. During actuation of the brake unit 14*a*, the piston 50 needs to be moved the combined distance of each gap 52*a*,52*b* before force is applied to the rotor 18*a*, and braking force is generated. This increases the amount of time necessary to generate braking force, and therefore increase the stopping distance of the vehicle.

There are often instances when the driver of the vehicle is operating the vehicle in a cruise-control mode, where the cruise control function is activated, and the vehicle maintains a desired speed set by the driver. However, there are instances where the driver of the vehicle deactivates the cruise control, prior to applying force to the brake pedal 30, which (if the driver does not apply force to the accelerator pedal) results in the vehicle coasting. This may occur when the driver of the vehicle has moved to an exit ramp off a highway. Another instance where this may occur may be when driving on the highway, and the driver of the vehicle anticipates having to decelerate the vehicle, which may be due to an accident seen by the driver, or increased traffic volume.

The pre-charge function of the present invention functions to generate pressure in the caliper 22*a*, moving the piston 50 such that each pad 48*a*,48*b* moves towards the rotor 18*a*, and contacts the rotor 18*a*, eliminating both gaps 52*a*,52*b*, as shown in FIG. 2B. However, although the pads 48*a*,48*b* contact the rotor 18*a*, no force is applied to the rotor 18*a*. Once the driver applies force to the brake pedal 30, the pressure in the rear brake system 16A is further increased such that the pressure in the caliper 22*a* moves the piston 50 such that force is applied to the rotor 18*a* by the pads 48*a*,48*b*, resulting in deceleration of the vehicle.

Figure 3:
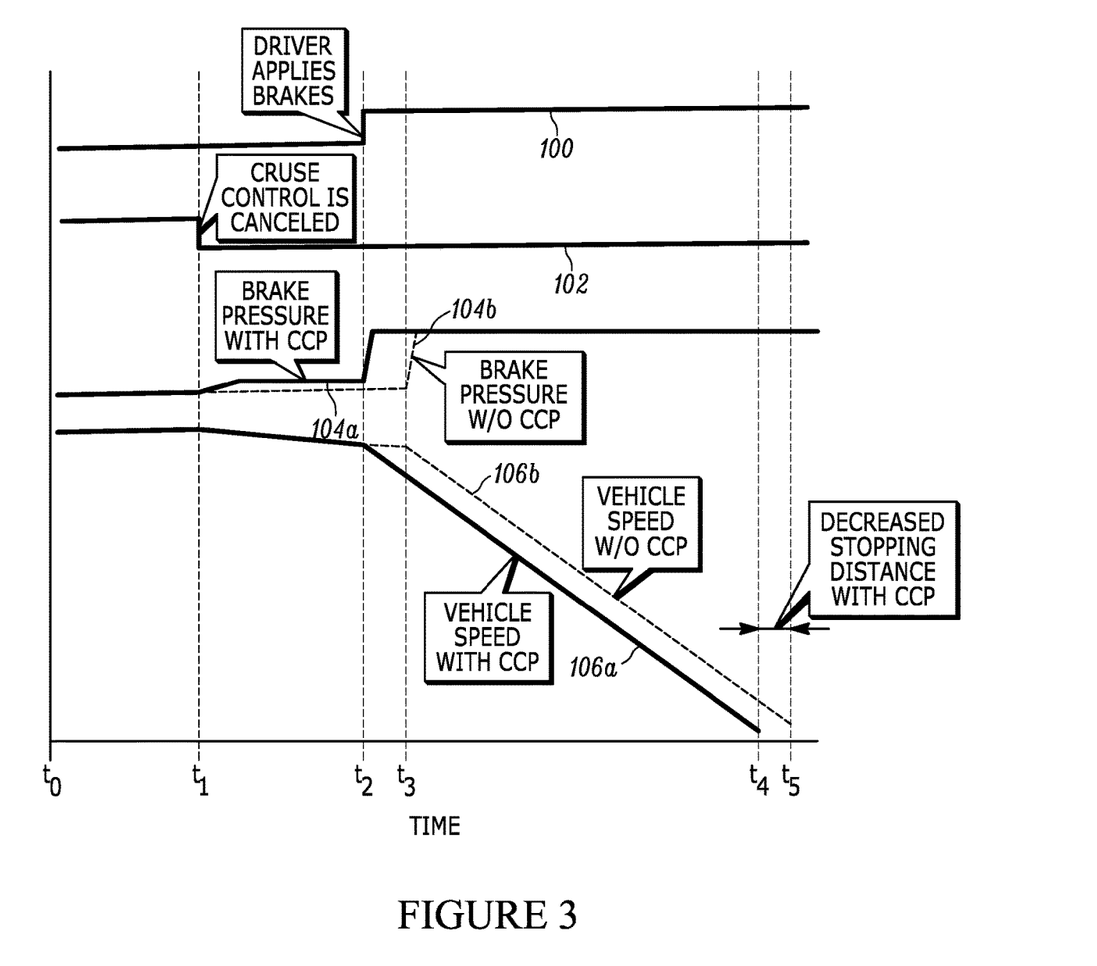
FIG. 3 is a diagram depicting a comparison of the operation of a braking system with no pre-charge function and the operation of a braking system having a pre-charge function, according to embodiments of the present invention.

Referring now to FIG. 3, a diagram is shown comparing the operation of the brake system 10 without a pre-charge function and with a pre-charge function according to the present invention. There are several operating parameters shown, including brake actuation 100, cruise control operating state 102, two different measurements of brake pressure 104*a*,104*b*, and two measurements of vehicle velocity 106*a*,106*b*. The measurements of brake pressure 104*a* and vehicle velocity 106*a* are taken when the pre-charge function is used, and the measurements of brake pressure 104*b* and vehicle velocity 106*b* are taken when the pre-charge function is not used.

Between time t0 and t1, the cruise control operating state 102 is active, the vehicle velocity 106*a*,106*b* is constant, there is no brake actuation 100, and the brake pressure 104*a*,104*b* is zero.

At time t1, the cruise control operating state 102 is changed from being active to being deactivated by the driver (i.e., the driver deactivates the cruise control function), and the vehicle velocity 106*a*,106*b* begins to decrease as a result of the vehicle coasting. Also, between time t1 and time t2, once the cruise control operating state 102 is changed to being deactivated, the pre-charge function of the present invention is activated, and the brake pressure 104*a* increases, such that the pressure in the caliper 22*a* moves each set of brake pads 48*a*,48*b*, eliminating the air gap 52*a*,52*b* on each side of the rotor 18*a* (as shown in FIG. 2B).

At time t2, the driver then applies force to the brake pedal, shown by the increase in brake actuation 100 at time t2, which also causes a further increase in brake pressure 104*a* beginning at time t2, such that force is applied to the rotor 18*a* by the pads 48*a*,48*b*, causing a decrease in the vehicle velocity 106*a*. If the brake actuation 100 is maintained, as shown in FIG. 3, the vehicle velocity 106*a* is eventually reduced to zero, at time t4.

When the pre-charge function is not used, the brake pressure between time t1 and time t2 is still zero. When the driver applies force to the brake pedal at time t2, the brake pressure 104*b* increases, but the initial increase in brake pressure 104*b* moves the brake pads 48*a*,48*b* to eliminate each air gap 52*a*,52*b*, such that no force is applied to the rotor 18*a* by the pads 48*a*,48*b*. Therefore, between time t1 and t2, and between time t2 and t3, there is no force applied to the rotor 18*a* by the pads 48*a*,48*b*, and the only decrease in the vehicle velocity 106*b* is the result of drag during the coasting of the vehicle. Once the pads 48*a*,48*b* have moved such that each air gap 52*a*,52*b* has been eliminated, force is then applied to the rotor 18*a* by the pads 48*a*,48*b*, which occurs at time t3. At time t3, the vehicle velocity 106*b* then begins to decrease as a result of force being applied to the rotor 18*a* by the pads 48*a*,48*b*. If the brake actuation 100 is maintained, as shown in FIG. 3, the vehicle velocity 106*b* is eventually reduced to zero, at time t5.

It is seen when looking at FIG. 3 that when the pre-charge function of the present invention is used, the vehicle velocity 106*a* is zero at time t4, and when the pre-charge function is not used, the vehicle velocity 106*b* is zero at time t5. The difference between time t4 and time t5 represents an increased amount of time required to stop the vehicle, which therefore results in an increased stopping distance.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus, comprising:
   a braking system for a vehicle, including:
      a hydraulic electronic control unit;
      at least one brake unit operable for being controlled by the hydraulic electronic control unit;
      a cruise control function operable for configuring the vehicle to maintain a constant speed;
      at least one rotor;
      a plurality of brake pads, a first of the plurality of brake pads located on a first side of the at least one rotor, and a second of the plurality of brake pads located on a second side of the at least one rotor, the brake unit operable for configuring the plurality of brake pads to selectively apply force to the at least one rotor; and
      a first air gap located between the first side of the at least one rotor and the first of the plurality of brake pads;
   a pre-charge function which includes generating pressure in the at least one brake unit;
   wherein the pre-charge function is activated by the hydraulic electronic control unit when the cruise control function is deactivated;
   wherein the pre-charge function includes generating pressure in the at least one brake unit such that the first of the plurality of brake pads is in contact with the first side of the at least one rotor, and the second of the plurality of brake pads is in contact with the second side of the at least one rotor; and
   wherein upon deactivation of the cruise control function and activation of the pre-charge function, as the pressure is generated in the at least one brake-unit, the first of the plurality of brake pads is moved towards the first side of the at least one rotor such that the first air gap is eliminated.

2. The apparatus of claim 1, further comprising:
   a second air gap located between the second side of the at least one rotor and the second of the plurality of brake pads;
   wherein upon deactivation of the cruise control function and activation of the pre-charge function, as the pressure is generated in the at least one brake-unit, the second of the plurality of brake pads is moved towards the second side of the at least one rotor such that the second air gap is eliminated.

3. The apparatus of claim 1, wherein the pre-charge function includes generating enough pressure in the at least one brake unit such that the first of the plurality of brake pads applies force the first side of the at least one rotor, and the second of the plurality of brake pads applies force to the second side of the at least one rotor, decreasing the rotational speed of the at least one rotor.

4. The apparatus of claim 1, further comprising:
   a brake pedal in communication with the hydraulic electronic control unit, the hydraulic electronic control unit operable for controlling the pressure generated by the brake unit based on the amount of force applied to the brake pedal;
   wherein the pre-charge function is activated prior to the driver of the vehicle applying force to the brake pedal.

5. The apparatus of claim 1, the at least one brake unit is a plurality of brake units, wherein the pre-charge function further comprises generating pressure in each of the plurality of brake units when the cruise control function is deactivated.

6. The apparatus of claim 1, wherein the pre-charge function is activated when the vehicle is travelling on an exit ramp of a highway.

7. The apparatus of claim 1, wherein the pre-charge function is activated when a driver of the vehicle anticipates having to decelerate the vehicle.

8. A braking system for a vehicle, comprising:
   a hydraulic electronic control unit;
   at least one brake unit operable for being controlled by the hydraulic electronic control unit;
   at least one rotor;
   a plurality of brake pads being part of the at least one brake unit, a first of the plurality of brake pads located on a first side of the at least one rotor, and a second of the plurality of brake pads located on a second side of the at least one rotor, the brake unit operable for configuring the plurality of brake pads to selectively apply force to the at least one rotor;
   a cruise control function operable for configuring the vehicle to maintain a constant speed;
   a pre-charge function which includes generating pressure in the at least one brake unit such that the first of the plurality of brake pads is in contact with the first side of the at least one rotor, and the second of the plurality of brake pads is in contact with the second side of the at least one rotor;
   wherein the pre-charge function is activated by the hydraulic electronic control unit when the cruise control function is deactivated;
   a first air dap located between the first side of the at least one rotor and the first of the plurality of brake pads;
   a second air gap located between the second side of the at least one rotor and the second of the plurality of brake pads; and
   wherein upon deactivation of the cruise control function and activation of the pre-charge function, as the pressure is generated in the at least one brake-unit, the first of the plurality of brake pads is moved towards the first side of the at least one rotor such that the first air gap is eliminated, and the second of the plurality of brake pads is moved towards the second side of the at least one rotor such that the second air gap is eliminated.

9. The braking system for a vehicle of claim 8, further comprising:
   a brake pedal in communication with the hydraulic electronic control unit, the hydraulic electronic control unit operable for controlling the pressure generated by the brake unit based on the amount of force applied to the brake pedal;
   wherein the pre-charge function is activated prior to the driver of the vehicle applying force to the brake pedal.

10. The braking system for a vehicle of claim 8, wherein the pre-charge function is activated when the vehicle is travelling on an exit ramp of a highway.

11. The braking system for a vehicle of claim 8, wherein the pre-charge function is activated when a driver of the vehicle anticipates having to decelerate the vehicle.

12. The braking system for a vehicle of claim 8, the at least one brake unit is a plurality of brake units, wherein the pre-charge function further comprises generating pressure in each of the plurality of brake units when the cruise control function is deactivated.

13. The braking system for a vehicle of claim 8, wherein the pre-charge function includes generating enough pressure in the at least one brake unit such that the first of the plurality of brake pads applies force the first side of the at least one rotor, and the second of the plurality of brake pads applies force to the second side of the at least one rotor, decreasing the rotational speed of the at least one rotor.

14. A method for reducing the stopping distance of the vehicle, comprising the steps of:
providing braking system for a vehicle;
providing a hydraulic electronic control unit being part of the braking system of the vehicle;
providing at least one brake unit being part of the braking system, the at least one brake unit operable for being controlled by the hydraulic electronic control unit;
providing at least one rotor being part of the braking system;
providing a plurality of brake pads being part of the at least one brake unit, a first of the plurality of brake pads located on a first side of the at least one rotor, and a second of the plurality of brake pads located on a second side of the at least one rotor, the brake unit operable for configuring the plurality of brake pads to selectively apply force to the at least one rotor;
providing a cruise control function operable for configuring the vehicle to maintain a constant speed; and
providing a pre-charge function being part of the braking system, the pre-charge function being activated by the hydraulic electronic control unit;
activating the pre-charge function after the cruise control function is deactivated, the pre-charge function generating pressure in the at least one brake unit such that the first of the plurality of brake pads is placed in contact with the first side of the at least one rotor, and the second of the plurality of brake pads is placed in contact with the second side of the at least one rotor;
providing a first air gap located between the first side of the at least one rotor and the first of the plurality of brake pads;
providing a second air gap located between the second side of the at least one rotor and the second of the plurality of brake pads;
deactivating the cruise control function;
eliminating the first air gap by moving the first of the plurality of brake pads towards the first side of the at least one rotor upon deactivation of the cruise control function and activation of the pre-charge function; and
eliminating the second air gap by moving the second of the plurality of brake pads towards the second side of the at least one rotor upon deactivation of the cruise control function and activation of the pre-charge function.

15. The method of claim 14, further comprising the steps of:
providing a brake pedal in communication with the hydraulic electronic control unit;
controlling the pressure generated by the brake unit based on the amount of force applied to the brake pedal using the hydraulic electronic control unit;
activating the pre-charge function prior to the driver of the vehicle applying force to the brake pedal.

16. The method of claim 14, further comprising the steps of activating the pre-charge function when the vehicle is travelling on an exit ramp of a highway.

17. The method of claim 14, further comprising the steps of activating the pre-charge function when a driver of the vehicle anticipates having to decelerate the vehicle.

18. The method of claim 14, further comprising the steps of:
providing the at least one brake unit as a plurality of brake units;
generating pressure in each of the plurality of brake units when the cruise control function is deactivated.

19. The method of claim 14, the pre-charge function further comprising the steps of:
generating enough pressure in the at least one brake unit such that the first of the plurality of brake pads applies force the first side of the at least one rotor;
generating enough pressure in the at least one brake unit such that the second of the plurality of brake pads applies force to the second side of the at least one rotor;
decreasing the rotational speed of the at least one rotor as the first of the plurality of brake pads applies force the first side of the at least one rotor, and the second of the plurality of brake pads applies force to the second side of the at least one rotor.

* * * * *